United States Patent
Basso et al.

(10) Patent No.: US 8,902,614 B2
(45) Date of Patent: Dec. 2, 2014

(54) METHOD AND CIRCUIT FOR SUPPRESSING BIAS CURRENT AND REDUCING POWER LOSS

(75) Inventors: Christophe Basso, Pibrac (FR); Jean-Paul Louvel, Colomiers (FR)

(73) Assignee: Semiconductor Components Industries, L.L.C., Phoenix, AZ (US)

(*) Notice: Subject to any disclaimer, the term of this patent is extended or adjusted under 35 U.S.C. 154(b) by 158 days.

(21) Appl. No.: 13/264,153

(22) PCT Filed: Jun. 10, 2009

(86) PCT No.: PCT/US2009/046899
§ 371 (c)(1),
(2), (4) Date: Oct. 12, 2011

(87) PCT Pub. No.: WO2010/144085
PCT Pub. Date: Dec. 16, 2010

(65) Prior Publication Data
US 2012/0069609 A1    Mar. 22, 2012

(51) Int. Cl.
*H02M 3/335* (2006.01)
*H02M 1/00* (2006.01)

(52) U.S. Cl.
CPC .. *H02M 3/33523* (2013.01); *H02M 2001/0032* (2013.01); *Y02B 70/16* (2013.01)
USPC ..................................... 363/21.12

(58) Field of Classification Search
CPC ................... H02M 3/33507; H02M 3/33523; H02M 2001/0032; H02M 1/32
USPC .................................. 363/21.12, 15, 17, 18
See application file for complete search history.

(56) References Cited

U.S. PATENT DOCUMENTS

| | | | |
|---|---|---|---|
| 5,612,858 A | 3/1997 | Weinmeier et al. | |
| 5,751,565 A * | 5/1998 | Faulk | 363/41 |
| 6,385,061 B1 * | 5/2002 | Turchi et al. | 363/21.15 |
| 7,589,982 B2 | 9/2009 | Wang et al. | |
| 7,679,939 B2 * | 3/2010 | Gong | 363/21.18 |
| 2008/0130325 A1 | 6/2008 | Ye | |
| 2012/0250378 A1 * | 10/2012 | Kok et al. | 363/78 |

OTHER PUBLICATIONS

Datasheet, "TLV431A Low Voltage Precision Adjustable Shunt Regulator," Semiconductor Components Industries, LLC, Jan. 2001.*

* cited by examiner

*Primary Examiner* — Adolf Berhane
*Assistant Examiner* — Jye-June Lee
(74) *Attorney, Agent, or Firm* — Rennie William Dover

(57) ABSTRACT

A method and circuit for suppressing a bias current and decreasing power consumption. A current suppression circuit is coupled to a circuit element, which is capable of conducting the bias current. Coupling the current suppression circuit to the circuit element forms a node. In one operating mode, the current suppression circuit applies a voltage to the node in response to a heavy load. In another operating mode, the current suppression circuit lowers the voltage at the node in response to a light load or no load. Lowering the voltage at the node decreases the flow of bias current through the circuit element thereby lowering power loss.

20 Claims, 2 Drawing Sheets

METHOD AND CIRCUIT FOR SUPPRESSING BIAS CURRENT AND REDUCING POWER LOSS

TECHNICAL FIELD

The present invention relates, in general, to power supplies and, more particularly, to power converters.

BACKGROUND

Power converters are used in a variety of portable electronic devices including laptop computers, cellular phones, personal digital assistants, video games, video cameras, etc. They may convert a dc signal at one voltage level to a dc signal at a different voltage level (this is a dc-dc converter), an Alternating Current (ac) signal to a dc signal (this is an ac-dc converter), a dc signal to an ac signal (this is a dc-ac converter), or an ac signal to an ac signal (this is an ac-ac converter). In many applications, power converters have standby power guidelines that specify the amount of power they can consume. As these guidelines become more stringent, power converter manufacturers are faced with improving the active mode efficiency during light load conditions and during no-load conditions. For example, power consumption guidelines for power converters are fast approaching the specification of consuming less than 100 milliwatts when left connected to the mains in a no-load condition.

In the race towards greater power efficiency, designers are chasing every source of power loss in the power converter. To lower power consumption, it would be advantageous to have a power converter and method for suppressing the current consumed in the regulation circuitry of a power converter. It would be of further advantage for the power converter and method to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

DETAILED DESCRIPTION

Generally, the present invention provides a method and a circuit for suppressing a bias current in a circuit thereby lowering power loss in the circuit. In accordance with an embodiment, the method and circuit include secondary side regulation circuitry that comprises an output stage having a programmable Zener diode coupled to an output node via a light emitting diode. By way of example, the programmable Zener diode is a TL431, which will be further discussed below. A current suppression circuit is connected to the programmable Zener diode via a series resistor. Under a heavy load condition, the current suppression circuit provides a current at the cathode terminal of the programmable Zener diode via the series resistor. The first terminal of the series resistor is connected to an auxiliary voltage which delivers a ground-referenced voltage. The second terminal of the series resistor is connected to the cathode of the programmable Zener diode. If the voltage at the first terminal of the series resistor is higher than the voltage at the cathode of the programmable Zener diode, a current is injected into the programmable Zener diode. Under a no load condition or a light load condition, the voltage across the series resistor is decreased or suppressed so that it no longer injects the bias current into the programmable Zener diode. In the presence of a transient voltage in the output stage, the current suppression circuit provides a voltage across the series resistor and injects a sufficient bias current into the programmable Zener diode in a sufficiently fast manner that the transient loading does not adversely affect the converter performance.

Figure 1:
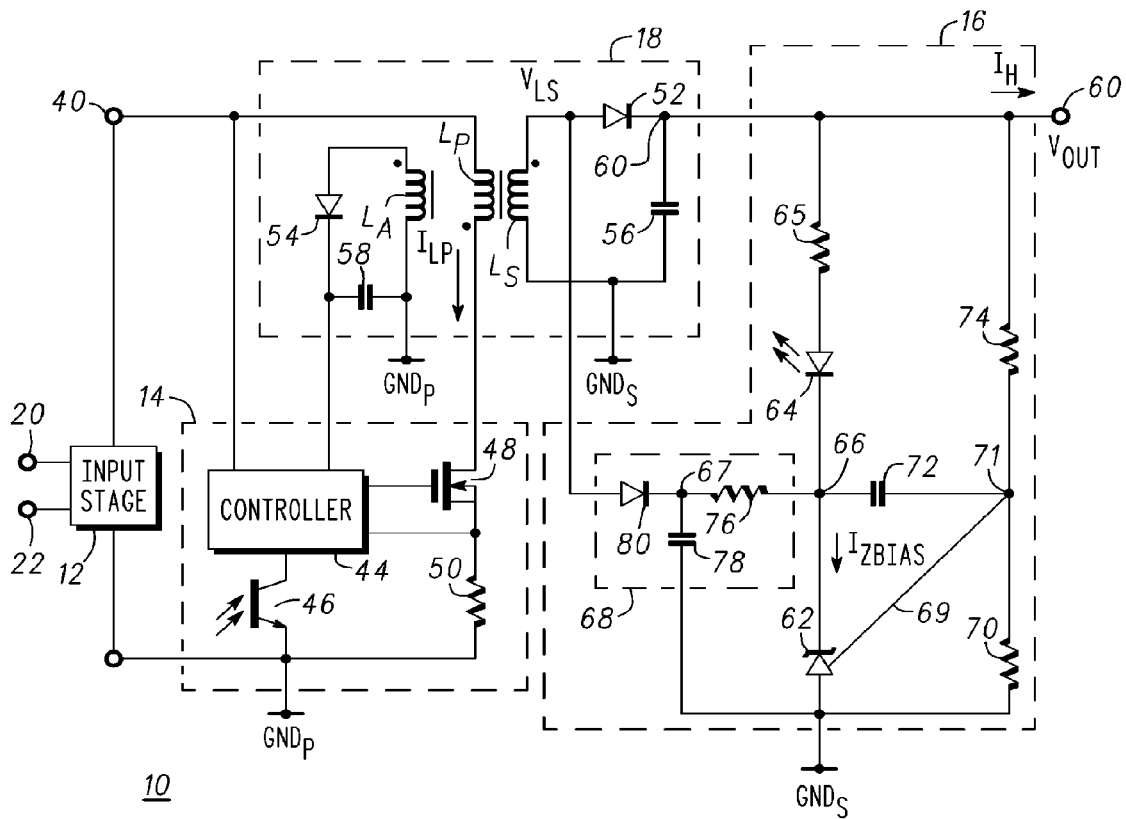
FIG. 1 is a circuit schematic of a flyback converter having a current suppression circuit in accordance with an embodiment of the present invention.

FIG. 1 is a schematic diagram of a flyback converter 10 in accordance with an embodiment of the present invention. Flyback converter 10 comprises an input stage 12 connected to a control stage 14. Input stage 12 and control stage 14 are inductively coupled to an output stage 16 by a transformer stage 18. Input stage 12 has inputs 20 and 22 coupled for receiving an input signal $V_{IN}$ and outputs coupled to control stage 14 and transformer stage 18. Input stage 12 rectifies an ac input voltage and delivers a dc voltage at input terminal 40. Input stage 12, control stage 14 and the portion of transformer stage 18 that includes inductor $L_P$ are referred to as being on the primary side and output stage 16 and the portion of transformer stage 18 that includes inductor $L_S$ are referred to as being on the secondary side.

Control stage 14 is comprised of a controller 44 having an input terminal connected to a photodetector 46 and an output terminal connected to a switching element 48. By way of example, controller 44 is a pulse width modulator controller that uses a skip-cycle technique or a frequency foldback technique and switching element 48 comprises an N-channel field effect transistor having a gate connected to the output of controller 44, a source coupled for receiving a source of operating potential such as, for example, $V_{SS}$, through a sense resistor 50, and a drain coupled to an input of transformer stage 18. Preferably, operating potential $V_{SS}$ is ground which is referred to as a primary ground and identified as $GND_P$. Controller 44 has an input connected to input stage 12 and an input coupled to transformer stage 18 for receiving a source of operating potential.

In accordance with an embodiment of the present invention, transformer stage 18 is comprised of a primary winding (coil) $L_P$, a secondary winding (coil) $L_S$, an auxiliary winding (coil) $L_A$, diodes 52 and 54, and a capacitors 56 and 58. More particularly, primary coil $L_P$ has a terminal connected to an input terminal 40 of control stage 14 and a terminal connected to the drain of transistor 48. Secondary coil $L_S$ has a terminal connected to the anode of diode 52 and a terminal coupled for receiving a source of operating potential such as, for example, $V_{SS1}$. Preferably, operating potential $V_{SS1}$ is a ground potential that is isolated from primary ground $GND_P$. Operating potential $V_{SS1}$ is referred to as a secondary ground and identified as $GND_S$. Capacitor 56 has a terminal connected to the cathode of diode 52 and a terminal coupled to secondary ground $GND_S$. The cathode of diode 52 and the terminal of capacitor 56 that is coupled to the cathode of diode 52 cooperate to form an output terminal or node 60. Auxiliary coil $L_A$ has a terminal connected to the anode of diode 54 and a terminal commonly connected to a terminal of capacitor 58 and for receiving a source of operating potential such as, for example, $GND_P$. The other terminal of capacitor 58 is connected to the cathode of diode 54.

Figure 2:
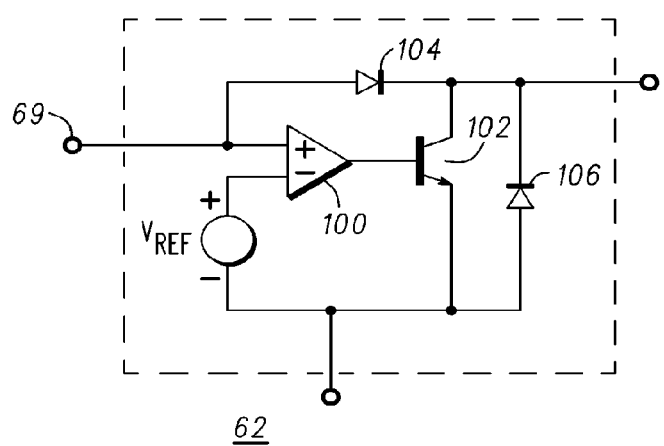
FIG. 2 is a circuit schematic of a portion of the flyback converter of FIG. 1.

Output stage 16 is comprised of a circuit element such as, for example, a programmable Zener diode 62 and a light emitting diode 64. In accordance, with an embodiment of the present invention Programmable Zener diode 62 is a TL431. Programmable Zener diode 62 has an anode or anode terminal coupled for receiving secondary ground $GND_S$, a cathode or cathode terminal connected to the cathode of diode 64 to form a node 66, and a reference pin or terminal 69 connected to a node 71. Programmable Zener diode 62 is also referred to as a voltage regulator. Briefly referring to FIG. 2, a circuit schematic of a programmable Zener diode 62 such as, for example, a TL431 is shown. Programmable Zener diode 62 comprises an operational amplifier 100 having a non-inverting input, an inverting input, and an output. The output is connected to the base of an NPN bipolar junction transistor 102. The non-inverting input serves as the reference terminal 69 and is coupled to the collector of NPN bipolar junction transistor 102 through a diode 104, where the anode of diode 104 is connected to the non-inverting input of operational amplifier 100 and the cathode of diode 104 is connected to the collector of NPN bipolar junction transistor 102. The cathode of diode 104 and the collector of NPN bipolar junction transistor 102 serve as the cathode of programmable Zener diode 62. The collector of NPN bipolar junction transistor 102 is connected to the cathode of a diode 106 and the emitter is connected to the anode of diode 106. A precision reference voltage $V_{REF}$, such as, for example, 2.5 volts is connected to the inverting input of operational amplifier 100. The emitter of bipolar transistor 102, the anode of diode 106, and an electrode of reference voltage $V_{REF}$ are coupled together and form the anode of programmable Zener diode 62. It should be noted that without a dedicated supply connection, programmable Zener diode 62 should have a current of at least 1 mA flowing from its cathode to its anode. In normal operation, a small current circulates in programmable Zener diode 62 to maintain a control signal for controller 44. This current can be as low as 300 microamps and is referred to as a normal operating current or as a nominal sub-current. Thus, an extra current is used to lift the circulating current to a value above 1 mA so that the desired breakdown voltage appears across Zener diode 62. The extra current is provided by current suppression circuit 68 and is referred to as a supplemental sub-current. Thus, the current flowing through Zener diode 62 is the sum of two sub-currents, the nominal sub-current and the supplemental sub-current. The performance of the converter is degraded in the absence of the extra or supplemental sub-current. The sum of the nominal sub-current and the supplemental sub-current multiplied by the output voltage adds at least 20 mW to the power consumption budget.

The anode of light emitting diode 64 is coupled to output terminal 60 through a resistor 65. Output stage 16 further comprises a resistor 70 having a terminal coupled for receiving secondary ground potential $GND_S$ and a terminal coupled to node 66 through a capacitor 72 and to output terminal 60 through a resistor 74. Reference pin 69 and a terminal of resistor 70, a terminal of resistor 74, and a terminal of capacitor 72 form node 71.

In addition, output stage 16 includes a current suppression circuit 68 coupled to node 66. In accordance with an embodiment of the present invention, current suppression circuit 68 comprises a diode 80 having an anode coupled to the anode of diode 52 and a cathode coupled to node 66 through a resistor 76. Resistor 76 is also referred to as a series resistor. The cathode of diode 80 is coupled to one terminal of capacitor 78 and the other terminal of capacitor 78 is coupled for receiving secondary ground potential $GND_S$.

In operation, flyback converter 10 converts a dc voltage from one voltage level to a different voltage level. A voltage $V_{IN}$ appearing at input terminals 20 and 22 is rectified and filtered, and the rectified filtered voltage is transmitted to input terminal 40 of control stage 14 and to an input of transformer stage 18. Control stage 14 includes a controller 44 that controls the operation of transformer stage 18. More particularly, controller 44 generates pulse width modulated control signals for controlling the operation of switching circuit 48. Controller 44 and switching circuit 48 create a current $I_{LP}$ that flows through inductor $L_P$. Because of the dot arrangement between inductors $L_P$ and $L_S$, no current circulates in the secondary side as diodes 70 and 52 are blocked, i.e., reverse biased. Controller 44 detects the current increase through sense resistor 50 and generates a control signal that opens switching element 48, thereby interrupting current flow within inductor $L_P$ and causing a voltage reversal across inductor $L_P$. In response to the voltage reversal across inductor $L_P$, a current flows within inductor $L_S$ which causes diode 52 and diode 80 to conduct current, thereby generating an output voltage $V_{OUT}$ at output terminal 60.

Preferably, output stage 16 is designed so that a bias current $I_{ZBIAS}$ of at least one milliamp (mA) flows through programmable Zener diode 62. In addition, light emitting diode 64 transmits a feedback signal to photodetector 46, which photodetector 46 generates a signal that modulates the control pin of controller 44. It should be noted that when bias current $I_{ZBIAS}$ falls below about 1 mA, the open loop gain of output stage 16 decreases resulting in an increase of the output impedance and the deterioration of the transient response of output stage 16. Output stage 16 can be designed to support bias currents $I_{ZBIAS}$ that are lower than 1 mA.

Current suppression circuit 68 is comprised of diode 80, resistor 76, and capacitor 78 and provides bias current $I_{ZBIAS}$ to programmable Zener diode 62. Under high power operation, PWM controller 44 generates output pulses that are substantially continuous. In response to the continuous switching pattern, an auxiliary voltage $V_{AUX}$ is generated at node 67 causing current suppression circuit 68 to inject a bias current into node 66 via resistor 76, which is injected into Zener diode 62. During high power operation and where a heavy load is coupled to output node 60, a current $I_H$ is drawn from output node 60 and auxiliary voltage $V_{AUX}$ at node 67 substantially equals the regulated output voltage $V_{OUT}$. The voltage across capacitor 78 may be referred to as an auxiliary power supply. When the power at output node 60 decreases because the load at output node 60 is changed to a light load or no load or to be below a load threshold, controller 44 enters a skip-cycle operating mode or decreases its operating frequency if a frequency foldback mode is implemented rather than a skip-cycle mode. In this operating mode, controller 44 chops the switching pattern of switch 48 leaving "switching holes" associated with the absence of a feedback loop. Chopping the switching pattern reduces voltage $V_{AUX}$ at node 67. Thus, in response to the power at output node 60 decreasing, voltage $V_{AUX}$ at node 67 begins to decrease. Under light load conditions, current $I_H$ from node 60 decreases and the voltage level at node 67 collapses, reducing or decreasing the voltage difference across resistor 76 and decreasing the injected current into programmable Zener diode 62. Thus, current suppression circuit 68 supplies a substantially zero bias voltage to resistor 76 and the injected current into programmable Zener diode 62 decreases to almost zero, i.e., the supplemental sub-current is decreased to zero or almost zero. Removing the supplemental sub-current or decreasing it to zero or to almost zero, leaves the nominal sub-current. Because the supplemental dc current injected into programmable Zener diode 62 becomes substantially zero, the current flowing through programmable Zener diode 62 is the normal bias current or nominal sub-current imposed by the control pin of controller 44 and the current transfer ratio of photocoupler 46. This results in the decrease of the power consumption of flyback converter 10.

When power is desired at output node 60, e.g., when a transient loading current occurs at node 60 which increases current $I_H$, auxiliary voltage $V_{AUX}$ quickly builds up at node 67 in response to an increase in the supplemental sub-current and, in cooperation with resistor 76, injects bias current $I_{ZBIAS}$ into programmable Zener diode 62, where bias current $I_{ZBIAS}$ is greater than 1 mA. Because of the speed at which current suppression circuit 68 generates auxiliary voltage $V_{AUX}$ and bias current $I_{ZBIAS}$, the output transient response is substantially unaffected by the change in current into programmable Zener diode 62.

Figure 3:
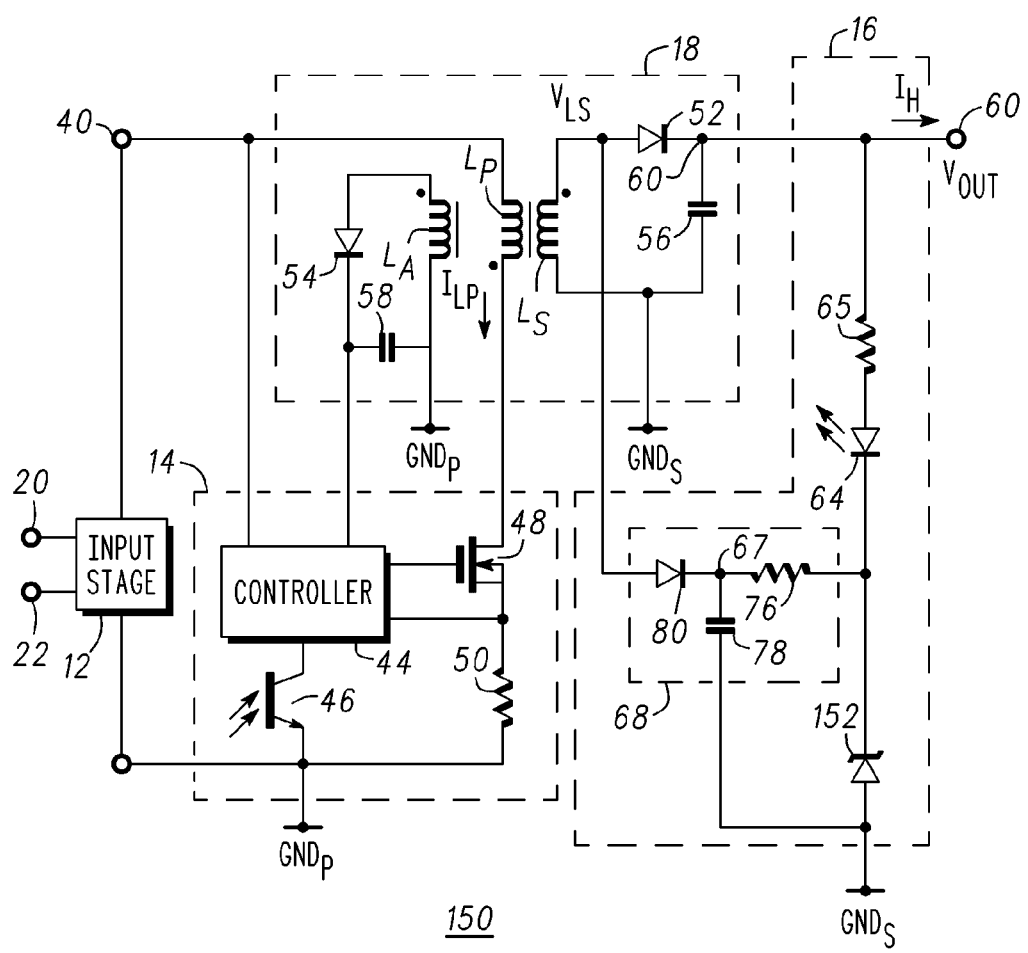
FIG. 3 is a circuit schematic of a flyback converter having a current suppression circuit in accordance with another embodiment of the present invention.

FIG. 3 is a circuit schematic of a flyback converter 150 in accordance with another embodiment of the present invention. Flyback converter 150 differs from flyback converter 10 in that resistors 70 and 74 and capacitor 72 are absent and Zener diode 152 is a standard Zener diode rather than a programmable Zener diode. In this embodiment, Zener diode 152 receives an extra bias from resistor 76.

By now it should be appreciated that a current suppression circuit and a method for changing a bias current have been provided. When operating under a heavy load, i.e., applying a heavy load, current suppression circuit 68 provides an auxiliary voltage $V_{AUX}$ at node 67 and injects a bias current into programmable Zener diode 62, i.e., a current is injected into the cathode of Zener diode 62 at node 66 in response to auxiliary voltage $V_{AUX}$ at node 67 and the load at node 60. Under a light load condition or a no load condition, i.e. applying a light load, current suppression circuit 68 decreases the auxiliary voltage $V_{AUX}$ at node 67 so that it suspends conduction of the bias current into programmable Zener diode 62, i.e., the current injected into node 66 is decreases in response to a lower load or the absence of a load (typically referred to as no load) at node 60. Because bias current conduction is suspended, power consumption is decreased and efficiency increases. In the presence of a transient signal, current suppression circuit 68 quickly delivers a bias voltage and a bias current to programmable Zener diode 62 so that it conducts the bias current and maintains a desired voltage thereacross.

Although specific embodiments have been disclosed herein, it is not intended that the invention be limited to the disclosed embodiments. Those skilled in the art will recognize that modifications and variations can be made without departing from the spirit of the invention. For example, embodiments of the present invention can be used with any secondary side circuitry whose supply voltage is interrupted during standby mode. This is the case for a synchronous rectifier for instance, where its supply would naturally disappear during standby mode and returns as the load returns. It is intended that the invention encompass all such modifications and variations as fall within the scope of the appended claims.

What is claimed is:

1. A method for changing power consumption by a circuit, comprising:
    providing the circuit, wherein the circuit comprises:
        a transformer stage having a primary side and a secondary side;
        a controller responsive to a light signal, the controller being on the primary side of the transformer stage;
        a current suppression circuit on the secondary side, the current suppression circuit having first and second terminals and a second node, the second node between the first and second terminals of the current suppression circuit, wherein the current suppression circuit includes a first diode having an anode and a cathode, a resistor having first and second terminals, the first terminal of the resistor coupled to the cathode of the first diode, and a capacitor having first and second terminals, the first terminal of the capacitor coupled to the first terminal of the resistor and to the second node;
        a Zener diode on the secondary side of the transformer stage, the Zener diode having a terminal coupled to the second terminal of the current suppression circuit; and
        a light emitting diode having a cathode coupled to the terminal of the Zener diode and the second terminal of the current suppression circuit to form a first node;
    injecting a first current into the first node in response to a first voltage at the second node and in response to a second current drawn from a third node, wherein the first current includes first and second sub-currents; and
    decreasing the first current in response to the second current drawn from the third node decreasing, wherein the second sub-current remains the same or decreases in response to decreasing the first current, and wherein the second sub-current is configured to maintain a control signal for the controller.

2. The method of claim 1, wherein decreasing the first current includes decreasing the first sub-current.

3. The method of claim 2, further including increasing the second voltage at the second node in response to the first sub-current increasing.

4. The method of claim 1, wherein decreasing the first current includes decreasing the first sub-current to zero.

5. The method of claim 1, further including developing the first voltage across the capacitor.

6. The method of claim 1, wherein injecting the first current into the first node includes injecting the first sub-current into the Zener diode.

7. The method of claim 6, wherein the Zener diode is a programmable Zener diode.

8. The method of claim 1, further including decreasing the first voltage at the second node to a second voltage in response to the second current at the third node decreasing.

9. The method of claim 8, further including increasing the second voltage at the second node in response to the second current at the third node increasing.

10. A method for changing power consumption by a circuit, comprising:
    providing the circuit, wherein the circuit comprises:
        a transformer stage having a primary side and a secondary side;
        a controller responsive to a light signal, the controller on the primary side of the transformer stage;
        a current suppression circuit on the secondary side, the current suppression circuit including a first diode having an anode and a cathode, a resistor having first and second terminals, the first terminal of the resistor coupled to the cathode of the first diode, and a capacitor having first and second terminals, the first terminal of the capacitor coupled to the first terminal of the resistor and to the cathode of the diode to form a second node;
        a Zener diode on the secondary side of the transformer stage, the Zener diode having a terminal coupled to the second terminal of the current suppression circuit; and a light emitting diode having a cathode coupled to the terminal of the Zener diode and the second terminal of the current suppression circuit to form a first node;

operating the circuit in a first operating mode by coupling a first load to the circuit and in response to the first load being coupled to the circuit injecting a first current into the first node and generating a first voltage at the second node, wherein the first current includes first and second sub-currents; and operating the circuit in a second operating mode by changing the first load coupled to the circuit, wherein changing the first load changes the first voltage to a second voltage at the second node and decreases the first sub-current and decreases the second sub-current or leaves the second sub-current the same, and wherein the second sub-current is configured to maintain a control signal for the controller.

11. The method of claim 10, wherein operating the circuit in the second operating mode includes operating the circuit in a skip-cycle mode.

12. The method of claim 11, wherein the circuit includes the control circuit coupled to a switch and where operating the circuit in the skip-cycle mode changes a switching pattern of the switch.

13. The method of claim 12, wherein operating the circuit in the skip-cycle mode changes the first voltage to the second voltage.

14. The method of claim 11, wherein changing the first load coupled to the circuit includes changing the first load to be below a load threshold.

15. The method of claim 10, wherein changing the first load comprises one of applying a second load to the circuit in place of the first load or removing the first load from the circuit so that the circuit is operating under a no load condition.

16. The method of claim 15, further including changing the second voltage to the first voltage in response to applying the first load to the circuit.

17. The method of claim 10, wherein operating the circuit in the second operating mode discharges the capacitor.

18. A circuit, comprising:
a transformer stage having a primary side and a secondary side and at least first and second terminals, the first terminal on the primary side and the second terminal on the secondary side;

an input stage having first and second input terminals and an output terminal, the input stage on the primary side of the transformer stage;

a control stage on the primary side of the transformer stage and having a plurality of terminals, a first terminal of the plurality of terminals coupled to the output terminal of the input stage, the control stage including a controller and a photodetector; and an output stage having a terminal coupled to the second terminal of the transformer stage, the output stage on the secondary side of the transformer stage, wherein the output stage further comprises:

a regulator comprising a Zener diode having a terminal and configured to maintain a control signal for the controller in a light load or no load condition; and a current suppression stage coupled to the terminal of the regulator, the current suppression stage including a first diode having an anode and a cathode, a resistor having first and second terminals, and a capacitor having first and second terminals, the first terminal of the resistor coupled to the cathode of the first diode, the first terminal of the capacitor coupled to the first terminal of the resistor and to the cathode of the diode to form a node.

19. The circuit of claim 18, wherein
the anode of the first diode is coupled to the second terminal of the transformer stage; and
the second terminal of the first resistor is coupled to the terminal of the regulator.

20. The circuit of claim 18, wherein the Zener diode comprises:
an operational amplifier having first and second inputs and an output;
a transistor having a control electrode and first and second current carrying electrodes, the control electrode coupled to the output of the operational amplifier;
a first diode having an anode coupled to the first current carrying electrode of the transistor and a cathode coupled to the second current carrying electrode of the transistor; and
a second diode having an anode coupled to the first input of the operational amplifier and a cathode coupled to the second current carrying electrode of the transistor and the cathode of the first diode.

* * * * *